(12) United States Patent
Brandstetter et al.

(10) Patent No.: US 8,865,243 B2
(45) Date of Patent: Oct. 21, 2014

(54) ACIDIFIED DAIRY FOOD

(75) Inventors: Bernhard Brandstetter, Muehldorf (DE); Peter Hofsaess, Egling (DE); Jochen Pfeifer, Penzberg (DE); Hermann Eibel, Freising (DE); Dimitrios Chronopoulos, Munich (DE)

(73) Assignee: Kraft Foods R & D, Inc., Deerfield, IL (US)

( * ) Notice: Subject to any disclaimer, the term of this patent is extended or adjusted under 35 U.S.C. 154(b) by 8 days.

(21) Appl. No.: 12/575,845

(22) Filed: Oct. 8, 2009

(65) Prior Publication Data

US 2010/0086663 A1 Apr. 8, 2010

(30) Foreign Application Priority Data

Oct. 8, 2008 (EP) .................................... 08166085

(51) Int. Cl.
| | | |
|---|---|---|
| *A23C 9/154* | (2006.01) | |
| *A23C 17/00* | (2006.01) | |
| *A23C 19/00* | (2006.01) | |
| *A23C 1/00* | (2006.01) | |
| *A23C 9/13* | (2006.01) | |
| *A23L 1/308* | (2006.01) | |
| *A23C 19/076* | (2006.01) | |
| *A23G 1/56* | (2006.01) | |
| *A23C 19/09* | (2006.01) | |

(52) U.S. Cl.
CPC ................ *A23G 1/56* (2013.01); *A23C 9/1307* (2013.01); *A23L 1/3081* (2013.01); *A23C 19/0765* (2013.01); *A23C 19/0904* (2013.01)
USPC ............ 426/580; 426/582; 426/583; 426/584

(58) Field of Classification Search
CPC .... A23G 1/56; A23C 9/1307; A23C 19/0765; A23L 1/3081
USPC .................................. 426/580, 582, 583, 594
See application file for complete search history.

(56) References Cited

U.S. PATENT DOCUMENTS

| | | | | |
|---|---|---|---|---|
| 1,993,932 A | * | 3/1935 | Joseph et al. ............... | 426/330.2 |
| 4,281,027 A | * | 7/1981 | Inoue et al. ................... | 426/631 |
| 4,948,600 A | * | 8/1990 | Zumbe et al. .................. | 426/45 |
| 4,968,512 A | * | 11/1990 | Kharrazi ........................ | 426/40 |
| 2004/0052910 A1 | * | 3/2004 | Nakamura et al. ............. | 426/125 |
| 2007/0292577 A1 | * | 12/2007 | Kopp et al. ................... | 426/518 |

FOREIGN PATENT DOCUMENTS

| | | | |
|---|---|---|---|
| EP | 0068229 A1 | | 1/1983 |
| EP | 68229 A1 | * | 1/1983 |
| EP | 1733624 A1 | * | 12/2006 |
| EP | 2174557 A1 | | 4/2010 |
| RU | 1839084 A1 | * | 12/1993 |
| SU | 1540777 A | * | 2/1990 |
| SU | 1540777 A1 | | 2/1990 |
| WO | 2005/004619 A2 | | 1/2005 |
| WO | 2006028360 A1 | | 3/2006 |
| WO | 2008/080810 A2 | | 7/2008 |
| WO | WO 2008080810 A2 | * | 7/2008 |

OTHER PUBLICATIONS http://www.foodscience.uoguelph.ca/dairyedu/icmanu.html Ice cream manufacturing, accessed on May 9, 2011.*
Redgwell, R., Trovato, V, Merinat, S, Curti, D Hediger, S and Manez, A. Dietary fibre in cocoa shell: characterisation of component polysaccharides. Food Chemistry 81(2003) 103-112.*
R. Redgwell, V. Trovato, S. Merinat, D. Curti, S. Hediger, A. Maneza. Dietary fibre in cocoa shell: characterisation of component polysaccharides. Food Chemistry 81 (2003) 103-112.*
Secrets of Masking Flavors http://www.foodproductdesign.com/ By: Cindy Hazen, Posted on: Nov. 1, 2003, accessed on Feb. 26, 2014.*
Extended European Search Report, European Patent Application No. 08166085.4, dated Mar. 20, 2009, 6 pages.

* cited by examiner

*Primary Examiner* — Humera Sheikh
*Assistant Examiner* — Subbalakshmi Prakash
(74) *Attorney, Agent, or Firm* — Fitch, Even, Tabin & Flannery LLP (57) ABSTRACT

The present invention provides an acidified dairy food comprising cocoa shells, a method for producing the acidified dairy food, and the use of cocoa shells to increase the fiber content and/or lower the fat content of an acidified dairy food.

11 Claims, 2 Drawing Sheets

ACIDIFIED DAIRY FOOD

CROSS-REFERENCE TO RELATED APPLICATION

This application claims priority to European Patent Application No. EP 08166085.4, filed Oct. 8, 2008, which is incorporated by reference herein in its entirety.

TECHNICAL FIELD

The present invention relates to an acidified dairy food, more particularly an acidified dairy food comprising cocoa shells. A method for producing the acidified dairy food is also provided.

BACKGROUND OF THE INVENTION

Cocoa shells (also known as cocoa hulls and cocoa husks) are the outer portions of cocoa beans which encase the inner nibs of the beans. The shell of a cocoa bean constitutes approximately 12-15% of the total mass of the bean.

Cocoa nibs and shells are typically separated by cracking cocoa beans and removing the shells. Cocoa beans may be cracked using, for example, mechanical rollers and/or heat treatment (e.g. infrared heat treatment) and the shells and nibs separated by a process known as "winnowing", which operates on the basis of the different densities of the shells and nibs. Separation of cocoa shells and nibs may be performed after cocoa beans have been fermented to aid in the development of certain flavours. Cocoa beans may also be roasted prior to separation of the shells and nibs to develop the taste and aroma of the beans and to assist in loosening the shells.

Following separation from cocoa shells, cocoa nibs are typically processed by reducing the fat content of the nibs and grinding the nibs to produce cocoa powder for use in various foods such as chocolate and cocoa beverages. The following illustrates a typical process for producing cocoa powder:

Cocoa nibs are first ground, usually in two stages (e.g. beater-blade milling followed by ball milling) to produce a liquor. The liquor is heated to a temperature typically greater than 110° C. and subsequently pressed under high pressure (e.g. 540 bar) to remove a portion of the cocoa butter from the liquor. The resulting cocoa cake has to be pre-broken, and is then typically fine milled in two steps using, for example, 2-pin mills (the pines of which are different sizes) produce cocoa powder. Such processing of cocoa nibs is expensive in terms of the energy and equipment required to produce a fine cocoa powder having acceptable organoleptic properties.

A further disadvantage of cocoa powder produced from fat-reduced and ground cocoa nibs (hereinafter "cocoa powder") is that it induces a bitter aftertaste in foods. Moreover, cocoa powder still has a high fat content relative to its calorific content. The need to at least partially remove the fatty cocoa butter component of cocoa nibs, which constitutes about 50-55 mass % of the nibs, contributes to the expense of producing cocoa powder.

Cocoa shells are generally viewed as an unwanted by-product of cocoa powder manufacture. Indeed, the 1973 EU Chocolate Directive limits the amount of cocoa shells in cocoa products to not more than 2% based on the total mass of the product.

As a consequence, cocoa shells are usually discarded or utilized in fertilizers or animal feed following separation from cocoa nibs. For example, U.S. Pat. No. 4,070,487 discloses the use of cocoa shells in ruminant feed in order to increase the appetite of ruminants such as lambs and calves.

The use of cocoa shell extracts is also known. For example, U.S. Pat. No. 4,156,030 discloses a method in which cocoa shells are extracted using an acidified ethanol solution. The extract is separated from the cocoa shell residue, for example, using a filter press, and the extract is used to produce a water-soluble berry-like flavouring and colouring material for foods. The cocoa shell residue is discarded, preferably following recovery of ethanol from the residue.

U.S. Pat. No. 4,532,147 also relates to extracts of cocoa shells. Specifically, waste cocoa material such as a cocoa shell-containing material is treated with an aqueous alcoholic medium to extract pigments from the material. The liquid phase is subsequently separated from the cocoa material and the aqueous medium removed to yield a flavourless and coloured extract.

Cocoa shell extracts as disclosed in the above-mentioned documents are not capable of providing foods to which they are added with an acceptable chocolate flavour. The extracts are also unsuitable as a useful source of nutrients such as insoluble dietary fibre, and the extracts are not suited to improving the texture (e.g. spreadability) of a food. Moreover, extraction of cocoa shells is costly, particularly since it requires considerable amounts of solvents.

In terms of the use of cocoa shells per se, EP 1 733 624 A1 indicates that cocoa shells may be incorporated into foods such as chocolate and cocoa beverages.

SUMMARY OF THE INVENTION

A first embodiment of the present invention is an acidified dairy food comprising cocoa shells. Cocoa shells have surprisingly been found to provide an acidified dairy food with a well-balanced chocolate flavour, even when no cocoa powder is included in the food. It has also been found that cocoa shells unexpectedly reduce the sour taste of an acidified dairy food, and an acidified dairy food comprising cocoa shells has no bitter aftertaste as compared to an acidified dairy food comprising cocoa powder.

Cocoa shells have furthermore been found to improve the texture of an acidified dairy food relative to cocoa powder. In particular, the water-binding properties of an acidified dairy food comprising cocoa shells are enhanced relative to an acidified dairy food comprising cocoa powder. The use of cocoa shells thereby increases the viscosity of an acidified dairy food relative to an equivalent amount of cocoa powder, so the food has a firmer consistency, particularly at ambient temperature. Such a food retains its shape during storage and has a relatively good spreadability. The increased water-binding ability of cocoa shells is also demonstrated by a lack of syneresis (release of whey) during use (e.g. cutting of the food) and following freezing and thawing of the food. An acidified dairy food comprising cocoa shells also retains a smooth and creamy texture (mouthfeel) following freezing and thawing.

The use of cocoa shells in an acidified dairy food is further advantageous for the reason that cocoa shells provide a valuable source of edible nutrients. In particular, cocoa shells have a high content of dietary fibre (approximately 55-65 mass %), including soluble dietary fibre (e.g. pectin) and insoluble dietary fibre (e.g. cellulose). The dietary fibre content of cocoa shells is about double that of cocoa powder. Cocoa shells are therefore advantageous as a high-fibre alternative to cocoa powder in an acidified dairy food. Further, cocoa shells have a low fat content (about 6-8 mass %) compared to cocoa powder (10-12 mass % minimum), so cocoa shells offer a reduced fat alternative to cocoa powder in an acidified dairy food.

The use of cocoa shells is also economically advantageous since cocoa shells may be used to partially or fully replace cocoa powder in an acidified dairy food, thereby reducing the requirement for costly processing of cocoa nibs and avoiding wastage of cocoa shells. The use of cocoa shells, which have a higher fibre content than cocoa powder, also avoids the need to add supplementary dietary fibre to an acidified dairy food.

Another embodiment of the present invention is a method for manufacturing an acidified dairy food as described above comprising either blending cocoa shells with a dairy food and acidifying the dairy food or blending cocoa shells with an acidified dairy food.

A further embodiment of the present invention is the use of cocoa shells to increase the fibre content and/or lower the fat content of an acidified dairy food.

DETAILED DESCRIPTION OF THE INVENTION

An embodiment of the present invention is an acidified dairy food comprising cocoa shells.

The term "acidified dairy food" refers to a dairy food (i.e. a milk-based food) which has undergone treatment to reduce its pH. A dairy food may be acidified by fermentation using lactic acid bacteria, examples of which include *Lactobacillus*, *Leuconostoc* and *Pediococcus*. This typically involves adding lactic acid bacteria to a dairy food, allowing the bacteria to undergo fermentation of carbohydrates in the food under controlled conditions to produce lactic acid, and killing/partially killing the bacteria (e.g. by heating) when the desired acidic pH is attained. Fermentation may also be performed by lactic acid bacteria occurring naturally in a dairy food. Methods for acidification by bacterial fermentation are well-known in the field. Alternatively, an acidified dairy food may be produced by directly adding an acid such as citric acid (e.g. lemon juice) or acetic acid (e.g. vinegar) to a dairy food to lower the pH of the food. Dairy foods which undergo acidification by bacterial fermentation or by the direct addition of acid to the food include milk (e.g. bovine milk, goats milk, etc.) and cream.

Examples of the acidified dairy food include cheese (e.g. cream cheese, cottage cheese and quark), sour cream, buttermilk, kefir, yogurt (e.g. UHT-treated, stirred or drinkable yogurt) and fromage frais. Preferred acidified dairy foods are cream cheese and yogurt. Two or more acidified dairy foods may be used in combination.

The fat content of the acidified dairy food is not particularly limited; for example, the acidified dairy food may be full-fat, low-fat or fat-free. However, the acidified dairy food is preferably a low-fat (less than 15 mass % fat) or fat-free food.

The term "cocoa shell" refers to the outer portion of a cocoa bean which encases the inner nib portion of the bean and is separable from the nib. Cocoa shells are obtainable by conventional methods which involve cracking cocoa beans and separating the shells from the nibs. For example, fermented/non-fermented, roasted/non-roasted cocoa beans may be cracked by mechanical rollers and/or heat treatment and the shells separated from the nibs by known "winnowing" techniques. It is preferred that the cocoa beans are fermented and roasted. The separated cocoa shells may be further processed, e.g. washed and dried. According to the present invention, cocoa shells are preferably separated from cocoa nibs.

Acidified dairy foods are associated with sour tastes due to the lowered pH of the foods. However, it has been found that an acidified dairy food comprising cocoa shells has a reduced sour taste. It cannot be said that this effect is achieved by a simple pH buffering mechanism since an acidified dairy food comprising cocoa shells may have a lower pH than the acidified dairy food base. It is rather supposed that cocoa shells have a sourness-masking effect, perhaps due to non-covalent binding or adsorption of shell components to lactic acid or lactate residues in the food. This is not achieved by adding cocoa powder to an acidified dairy food.

Cocoa shells have also been found to improve the stability of an acidified dairy food during freezing and thawing of the food. This effect is not achieved using hydrocolloids such as agar and carob bean gum, which are traditionally used to stabilize foods. Accordingly, the acidified dairy food may be frozen, or the acidified dairy food may be preserved by freezing and subsequently thawed without any negative impact on the taste or texture of the food.

Cocoa shells are preferably ground so that they are more easily blended into an acidified dairy food, the food thereby having a good mouthfeel and a good chocolate taste. The term "ground" refers to shells which have been subjected to grinding, crushing, pulverization or some other treatment in order to reduce the size of the shell particles, preferably following separation of the shells from cocoa nibs. Cocoa shells may be ground using conventional techniques such as mechanical milling, whereby moving mechanical parts reduce the size of the shell particles. Examples of mechanical milling systems include beater blade mills, pin mills and differential mills. Alternatively, and preferably, cocoa shells may be ground using a vortex processing apparatus such as that described in EP 1 733 624 A1, which utilizes an air vortex to reduce the size of cocoa shell particles without the shells contacting moving mechanical parts. More preferably, cocoa shells are ground by jet-milling, whereby high-velocity air subjects shell particles to severe turbulence. This causes inter-particle collisions which reduce the size of the shell particles. A rotating classifier wheel in the jet-milling apparatus allows only shell particles having a diameter below a particular maximum value to pass through, thus controlling the size of the ground shell particles exiting the apparatus.

In terms of particle size, it is preferred that the ground cocoa shell particles have a $D_{90}$ value of less than 25 μm ($D_{90}$<25 μm) so that the food has an optimum taste and mouthfeel. It is also preferred that less than 1%, more preferably less than 0.05%, of the cocoa shell particles have a diameter greater than 75 μm.

Cocoa shells are preferably contained in the acidified dairy food in an amount of 1-15 mass % based on the total mass of the food from the viewpoint of providing a good chocolate taste and a good mouthfeel. For example, a drinkable or stirred yogurt having a cocoa shell content of 1-5 mass % has a pleasant chocolate taste and a good mouthfeel. Cocoa shells are more preferably contained in the acidified dairy food in an amount of 1.5-13 mass %, most preferably 3-13 mass % based on the total mass of the food. A cocoa shell content of 3-6 mass % is particularly advantageous for a spreadable acidified dairy food, and a cocoa shell content of 9-13 mass % is particularly advantageous for a whipped acidified dairy food and a praline filling.

The acidified dairy food preferably has a calorie content of 150-400 kcal per 100 g (e.g. 350-400 kcal for a full-fat acidified dairy food), and is most preferably a low-fat food having a calorie content of 230-270 kcal per 100 g (e.g. low-fat cream cheese). Further, the acidified dairy food preferably has a fibre content of 1-12 mass %, more preferably 1-9 mass % and most preferably 3-9 mass %, based on the total mass of the food The acidified dairy food preferably has a pH of 3.5-6.0, more preferably 4.0-5.5 and most preferably 4.8-5.3. Cocoa shells are particularly advantages for providing such a food with a good taste, texture and stability compared to neutral or basic foods, which are generally less viscous, have a softer texture and a have lower microbiological stability than acidified dairy foods.

The acidified dairy food is preferably spreadable, meaning that the food is capable of being distributed approximately uniformly over a surface by applying pressure thereto. The use of cocoa shells in such a food improves the spreadability of the food compared to a food comprising cocoa powder. A particular example of a spreadable acidified dairy food is cream cheese. Cocoa shells may be used in a low-fat cream cheese or even a full-fat cream cheese to produce a reduced fat alternative to traditional chocolate-flavoured spreads, which are typically fat and sugar based. Cocoa shells are also a healthier alternative to cocoa powder for producing a low-fat chocolate-flavoured cream cheese for the reason that cocoa shells have a lower fat content and a higher dietary fibre content than cocoa powder.

The acidified dairy food may be whipped. The term "whipped acidified dairy food" refers to an acidified dairy food which has been mixed with a gas (e.g. air or nitrogen) so that the gas is incorporated into the food and the volume of the food is increased relative to the non-whipped food. A whipped acidified dairy food comprising cocoa shells exhibits a good storage stability, even in the absence of stabilizers such as a hydrocolloid or gelatine. Also, cocoa shells are able to provide a whipped acidified dairy food with a good chocolate flavour in the absence of any other chocolate flavourings (e.g. cocoa powder, chocolate mass, cocoa extracts). A particular example of a whipped acidified dairy food is whipped cream cheese. It has been found that a stable whipped cream cheese product may be produced by incorporating air into cream cheese comprising cocoa shells with at least 15% overrun at ambient or higher whipping temperatures, even when no stabilizers are included in the food.

The acidified dairy food may comprise one or more further ingredients such as cocoa powder (preferably alkalized cocoa powder), sugar (e.g. sucrose), chocolate, cream, butter, hazelnut paste and flavourings (e.g. vanilla flavouring and/or hazelnut flavouring). The further ingredients may constitute up to 50 mass % of the acidified dairy food in total, preferably no more than 40 mass %. In particular, it is preferred that the acidified dairy food comprises no more than 3 mass % cocoa powder. More preferably, the acidified dairy food comprises no more than 3 mass % alkalized cocoa powder and no non-alkalized cocoa powder in order to avoid bitter tastes. Most preferably, the acidified dairy food comprises no cocoa powder at all.

It is also preferred that the acidified dairy food comprises no more than 25 mass % sugar. It is also preferred that the acidified dairy food comprises no more than 25 mass % chocolate. It is also preferred that the acidified dairy food comprises no more than 35 mass % cream. It is also preferred that the acidified dairy food comprises no more than 10 mass % butter. It is also preferred that the acidified dairy food comprises no more than 3 mass % hazelnut paste.

The water content of the acidified dairy food may be up to 80 mass % based on the total mass of the food, and is preferably less than 70 mass %.

According to another embodiment of the present invention, an acidified dairy food comprising cocoa shells as described above is manufactured by a method comprising blending cocoa shells with a dairy food and acidifying the food, or blending cocoa shells with an acidified dairy food. Blending may be performed using conventional methods known in the art for blending foods; for example, cocoa shells may be blended with a (acidified) dairy food using conventional mixing equipment such as a Roversi™ cooker, a Stephan cooker, a Thermomix™ blender, a ribbon blender, an APV-liquiverter or similar equipment in order to intimately mix the cocoa shells into the food. More particularly, cocoa shells may be blended into a (acidified) dairy food in a Stephan cooker for 5-10 minutes at a temperature of up to 85° C. An acidified dairy food having cocoa shells blended therein may undergo further processing such as pasteurization and filling. The filling step may be hot filling (>65° C.) or hygienic cold filling (<40° C.)

According to a preferred embodiment of the present invention, an acidified dairy food comprising cocoa shells is manufactured by blending cocoa shells with a non-acidified dairy food and acidifying the food by fermentation or addition of an acid such as described above. Following acidification, the food may be treated with high shear equipment such as a high pressure homogenizer, a Burodsa™ mixer or a Dispax™ mixer.

EXAMPLES

The present invention is illustrated by the following examples. Unless otherwise stated, all amounts are percentages by mass (mass %) based on the total mass of the food.

Each ingredient (e.g. cocoa shells, cocoa powder) listed in the Reference Example, Examples and Comparative Examples was taken from the same batch.

Cocoa powder was produced from the nibs of de-shelled fermented and roasted Ivory Coast cocoa beans. The separated cocoa nibs were roasted, milled and pressed by conventional methods to produce a cocoa cake. The cake was milled by a conventional two-step milling process to produce cocoa powder having a $D_{90}$ value of 20.07 μm.

Ground cocoa shells were produced by subjecting shells obtained from the above fermented and roasted cocoa beans to jet-milling. The ground cocoa shells had a $D_{90}$ value of 24.50 μm.

Production of Cream Cheese Spread

A chocolate-flavoured, low-fat cream cheese spread according to the Reference Example, Examples 1-4 and Comparative Examples 1 and 2 was produced as follows:

1.4 kg of a cream cheese spread base was mixed with cocoa shells and/or cocoa powder in a Thermomix™ mixer (grade 2-3, 800 revolutions per min (rpm)) at 50-60° C. for 7-8 minutes. The mixture was subsequently mixed with a further 4.0 kg of the cream cheese spread and the remaining ingredients in a Roversi™ cooker. Mixing was conducted initially for two minutes at room temperature using a mixing speed of 160 rpm, followed by mixing for three minutes at a temperature of 82° C. and a mixing speed of 160 rpm. The mixed food was filled into plastic cups in 200 g aliquots at a temperature of 70° C.

Determination of Particle Size by Laser Diffraction

The size of cocoa shell/cocoa powder particles was determined as an equivalent diameter based on a volume distribution. A $D_{90}$ value of, for example, 20 μm means that 90% by volume of particles have an equivalent diameter of 20 μm or less based on a volume distribution.

A volume distribution for a cocoa shell/cocoa powder sample was produced by analyzing the laser diffraction pattern created by circulating a dispersion of the sample through a laser beam in a Malvern apparatus which operates on the basis of Mie light scattering.

The diffraction pattern was analyzed using Fraunhofer theory to produce a particle size distribution from which equivalent diameters ($D_{90}$ values) were determined.

A dispersed sample was prepared by first mixing a cocoa shell/cocoa powder sample, thoroughly in a container by inverting and shaking. Approximately 2 g of the sample was then mixed with a small amount of Akomed R™ to form a smooth paste. An amount (160 mg±20 mg) of the paste was weighed out into a clean round-bottomed tube and 20 ml of Akomed R™ was added thereto. The sample was dispersed using an ultrasonic probe for two minutes at maximum displacement.

Evaluation

Panel Test

The foods were evaluated by a panel test using 10 organoleptic experts from Kraft Foods GTQ Munich dairy and confectionery department. The foods were blind tasted and rated on appearance, texture and taste. The results are an average of the ratings given by each tester.

Determination of Stevens Values

The Stevens value of a food indicates its firmness at a particular temperature.

The Stevens value of a food (at 10° C.) was determined by measuring the peak penetration force (in grams) of a conical (45°) probe dropped into a sample of the food to a depth of 10 mm at a penetration speed of 2 mm/second using a Stevens LFRA Texture Analyzer. The sample was contained in a tub in an amount of 200 g. Prior to testing, the sample was stored at a temperature of 10° C. for two days without mixing to equilibrate the sample.

The reported Stevens value of a food is the average of the Stevens values recorded for three samples of the food, the standard deviation of the Stevens values of the samples being no more than 10%.

REFERENCE EXAMPLE

Cream Cheese Spread Comprising Chocolate and Cocoa Powder

Composition of the cream cheese spread:

| | |
|---|---|
| Philadelphia Dessert ™ cream cheese spread (manufactured by Kraft Foods, Ltd.) | 75.35% |
| Milka ™ milk chocolate (manufactured by Kraft Foods, Ltd.) | 18.00% |
| Alkalized cocoa powder (11% fat; 30% fibre) | 3.00% |
| Sucrose | 3.00% |
| Hazelnut paste | 0.50% |
| Vanilla flavouring | 0.10% |
| Hazelnut flavouring | 0.05% |
| Total fibre: | 1.6% |
| Total fat: | 15.4% |
| Total calories (kcal/100 g): | 260 |
| pH = 5.09 | |

The spread was found to have a good chocolate taste; however, sour notes were detected.

The spreadability and texture (mouthfeel) of the spread were good. No syneresis, change in flavour or change in spreadability was detected following freezing the spread at −18° C. and thawing to 10° C.

Example 1

Cream Cheese Spread Comprising Chocolate, Cocoa Powder and Cocoa Shells

Composition of cream cheese spread:

| | |
|---|---|
| Philadelphia Dessert ™ cream cheese spread (manufactured by Kraft Foods, Ltd.) | 75.35% |
| Milka ™ milk chocolate (manufactured by Kraft Foods, Ltd.) | 18.00% |
| Non-alkalized cocoa powder (11% fat; 30% fibre) | 1.50% |
| Ground cocoa shells (6% fat; 60% fibre) | 1.50% |
| Sucrose | 3.00% |
| Hazelnut paste | 0.50% |
| Vanilla flavouring | 0.10% |
| Hazelnut flavouring | 0.05% |
| Total fibre: | 2.1% |
| Total fat: | 15.3% |
| Total calories (kcal/100 g): | 258 |
| pH = 5.06 | |

The spread was found to have a good chocolate taste and produced less sour notes than the spread of the Reference Example.

The spreadability and mouthfeel of the spread were good. No syneresis, change in flavour or change in spreadability was detected following freezing the spread at −18° C. and thawing to 10° C. Thus, the texture, flavour and stability of the spread were comparable to the spread of the Reference Example.

The spread had a higher fibre content than the spread of the Reference Example.

Example 2

Cream Cheese Spread Containing Cocoa Shells and No Cocoa Powder

Composition of the cream cheese spread:

| | |
|---|---|
| Philadelphia Light FWPC ™ cream cheese spread (manufactured by Kraft Foods, Ltd.) | 52.0% |
| Cream (30% fat) | 23.0% |
| Sucrose | 17.5% |
| Ground cocoa shells (6% fat; 60% fibre) | 6.0% |
| Hazelnut paste | 1.5% |
| Total fibre: | 3.9% |
| Total fat: | 14.5% |
| Total calories (kcal/100 g): | 237.4 |

The spread exhibited a surprisingly good chocolate and creamy taste, even though the spread contained no chocolate. The spread also had a corn-grainwave aftertaste. No bitter or sour notes were detected.

The spread had a good spreadability, and no syneresis was detected following freezing the spread at −18° C. for 26 days and thawing to 10° C. The spread was also found to be stable following storage at −18° C. for nine months.

The Stevens value of the spread at 10° C. (St10 value) following freezing at −18° C. for 26 days and thawing at 10°

C. for two days was found to be 87 g. The St10 value of the spread following storage at 4° C. for 44 days was found to be 60 g. The spread retained its shape during storage for 24 hours at room temperature.

Comparative Example 1

Composition of the cream cheese spread:

| | |
|---|---|
| Philadelphia Light FWPC ™ cream cheese spread (manufactured by Kraft Foods, Ltd.) | 52.0% |
| Cream (30% fat) | 23.0% |
| Sucrose | 17.5% |
| Non-alkalized cocoa powder (11% fat; 30% fibre) | 6.0% |
| Hazelnut paste | 1.5% |
| Total fibre: | 2.1% |
| Total fat: | 14.8% |
| Total calories (kcal/100 g): | 246.3 |
| pH = 4.84 | |

The spread delivered a good chocolate taste, but sour and bitter notes were detected.

The spreadability and texture of the spread were good. No syneresis was detected following storage of the spread at −18° C. and thawing to 10° C.

The St10 value of the spread following freezing at −18° C. for 26 days and thawing at 10° C. for two days was found to be 41.9 g. The St10 value of the spread following storage at 4° C. for 44 days was found to be 26 g. The spread did not retain its shape during storage for 24 hours at room temperature.

The markedly increased Stevens values of the spread of Example 2 compared to the spread of Comparative Example 1 demonstrates the enhanced water binding ability of cocoa shells compared to cocoa powder. This effect is probably driven mainly by the higher (approximately doubled) fibre content of cocoa shells relative to cocoa powder. The use of cocoa shells in place of cocoa powder thus significantly increases the viscosity of a low viscosity acidified dairy food.

Example 3

Composition of the cream cheese spread:

| | |
|---|---|
| Philadelphia Light FWPC ™ cream cheese spread (manufactured by Kraft Foods, Ltd.) | 52.0% |
| Cream (30% fat) | 20.0% |
| Sucrose | 14.5% |
| Ground cocoa shells (6% fat; 60% fibre) | 12.0% |
| Hazelnut paste | 1.5% |
| Total fibre: | 7.5% |
| Total fat: | 13.9% |
| Total calories (kcal/100 g): | 223.8 |
| pH = 5.04 | |

The spread exhibited a good chocolate taste, which was more intense than the chocolate taste of the spread produced in Example 2. The spread was also slightly sweeter than the spread of Example 2, and the spread had a corn-grainwave aftertaste. No bitter or sour notes were detected.

No syneresis or change in taste, appearance or texture was observed following freezing the spread at −18° C. for 26 days and thawing to 10° C. This was also the case following storage of the spread at 4° C. for 44 days.

The spread had a significantly higher viscosity than the spread of Example 2. Specifically, the St10 value of the spread following freezing at −18° C. for 26 days and thawing at 10° C. for two days was found to be 200 g, and the St10 value of the spread following storage at 4° C. for 44 days was found to be 203 g. This illustrates the increase in the viscosity of a cream cheese spread due to an increased amount of cocoa shells therein. Such a spread is particularly suited for use as, for example, a filling or a mousse.

Comparative Example 2

Composition of the cream cheese spread:

| | |
|---|---|
| Philadelphia Light FWPC ™ cream cheese spread (manufactured by Kraft Foods, Ltd.) | 52.0% |
| Cream (30% fat) | 20.0% |
| Sucrose | 14.5% |
| Non-alkalized cocoa powder (11% fat; 30% fibre) | 12.0% |
| Hazelnut paste | 1.5% |
| Total fibre: | 3.9% |
| Total fat: | 14.5% |
| Total calories (kcal/100 g): | 241.6 |
| pH = 5.15 | |

The spread produced intense dark chocolate-like, sour and bitter notes.

The spreadability and texture of the spread were good. No syneresis was detected following storage of the spread at −18° C. and thawing to 10° C.

The St10 value of the spread following freezing at −18° C. for 26 days and thawing at 10° C. for two days was found to be 198 g. The St10 value of the spread following storage at 4° C. for 44 days was found to be 195 g.

The rheology (as measured by the Stevens values) of the spreads of Example 3 and Comparative Example 2, which comprised 12% cocoa shells and 12% cocoa powder respectively, were thus similar. However, the spread of Example 3 produced no bitter or sour notes, even though the pH of the spread was lower than the pH of the spread of Comparative Example 2. Furthermore, the fibre content of the spread of Example 3 was almost double that of the spread of Comparative Example 2.

Effects of Adding Cocoa Shells to Cream Cheese

No syneresis was observed following home use simulation (cutting) of the spreads of Examples 1-3 at 22° C. for two hours and four hours. In contrast, syneresis was observed in amounts of 4.49% and 6.13% in the Philadelphia Light FWPC™ cream cheese spread base following home use simulation of the spread at 22° C. for two hours and four hours respectively.

Figure 1:
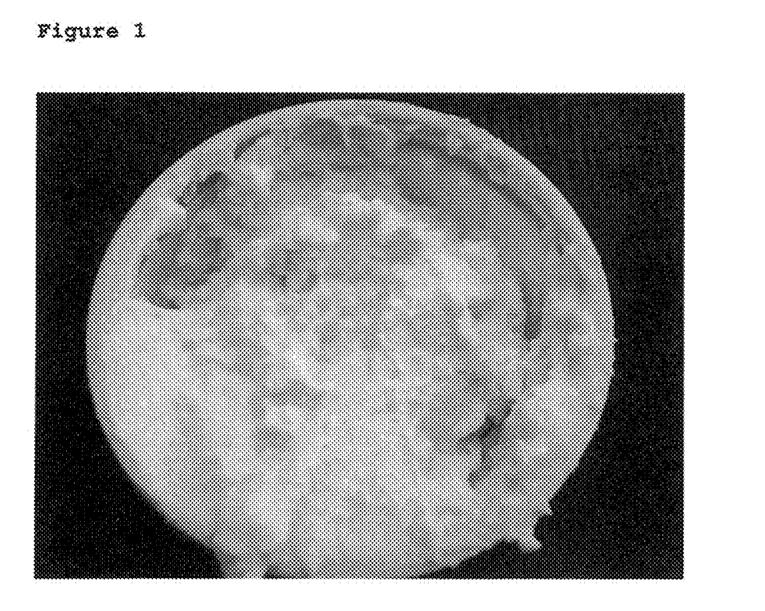
FIG. 1: Photograph of Philadelphia Light FWPC™ cream cheese spread (manufactured by Kraft Foods, Ltd.) following freezing at −18° C. for 26 days and thawing to 10° C.

The cream cheese spread base also developed an unpleasant crumbly texture following freezing at −18° C. for 26 days and thawing to 10° C. (see FIG. 1). On the other hand, the spreads of Examples 1-3 retained smooth textures and had good spreadabilities following such freezing and thawing.

Figure 2:
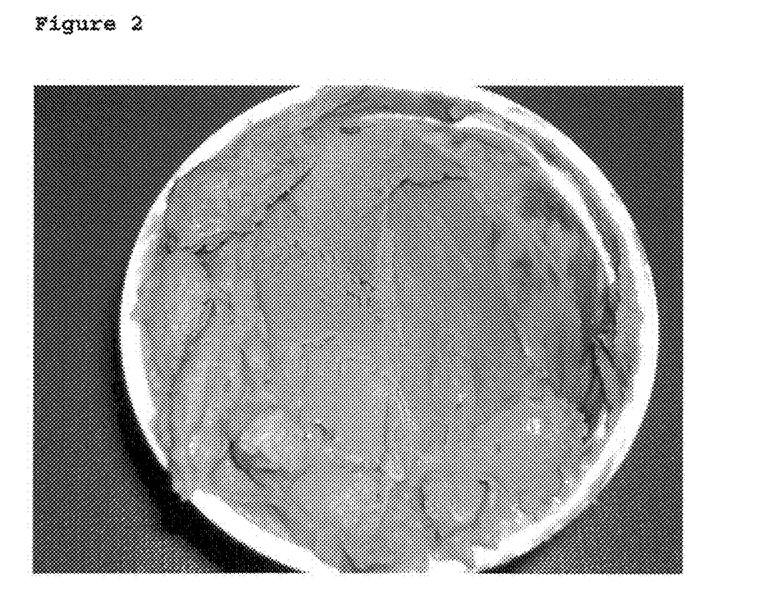
FIG. 2: Photograph of Philadelphia Light FWPC™ cream cheese spread (manufactured by Kraft Foods, Ltd.) comprising 3 mass % ground cocoa shells following freezing at −18° C. for 26 days and thawing to 10° C.

The superior texture of a cream cheese spread comprising cocoa shells is also demonstrated by FIG. 2, which shows a Philadelphia Light FWPC™ spread comprising 3 mass % ground cocoa shells as used in Examples 1-3. The spread clearly has a smoother texture than the spread shown in FIG. 1. This illustrates the stabilizing effect of cocoa shells in a cream cheese spread.

Example 4

Whipped Cream Cheese Spread Comprising Cocoa Shells and No Flavourings

Composition of the cream cheese spread:

| | |
|---|---|
| Philadelphia Light FWPC ™ cream cheese spread (manufactured by Kraft Foods, Ltd.) | 50.7% |
| Cream (30% fat) | 17.9% |
| Sucrose | 15.3% |
| Ground cocoa shells (6% fat; 60% fibre) | 12.6% |
| Butter | 3.5% |
| Total fibre: | 7.8% |
| Total fat: | 15.1% |
| Total calories (kcal/100 g): | 236.5 |
| pH = 4.93 | |

The spread was whipped using a Mondomix™ whipping unit to incorporate air into the spread (initial pressure=6 bar, final pressure=1.8 bar, density=25 g/cm³, feeding pump speed=600 rpm, mixing head speed=250 rpm, feed rate=0.0167 kg/second). The overrun level of the whipped cream cheese was 16%, overrun being calculated as follows:

<sup>1</sup> Overrun (%)=100−{(weight after whipping/weight before whipping)*100}=100−{(210 g/250 g)*100}=16%

The whipped cream cheese had a good chocolate taste, even though no chocolate flavourings were present. A cornwave aftertaste was detected. The whipped cream cheese also exhibited a good spreadability and was freeze-thaw stable. No loss of shape was observed following storage of the whipped cream cheese at room temperature for one week, even though the food contained no stabilizing additives (e.g. a hydrocolloid).

Example 5

Drinkable Yogurt Comprising Cocoa Shells

A drinkable chocolate-flavoured yogurt comprising 9 mass % cocoa shells was prepared by mixing 50 g of ground cocoa shells into 500 ml of a natural yogurt drink (1% fat) in a Thermomix™ mixer. Mixing was initially carried out at a mixing speed of 3 rpm whilst heating the mixture to a temperature of 72.2° C. over a period of six minutes. Further mixing was performed at 2 rpm and 68° C. for five minutes. The mixture was subsequently hot-filled into cups in 200 g aliquots and stored at 4° C.

Figure 3:
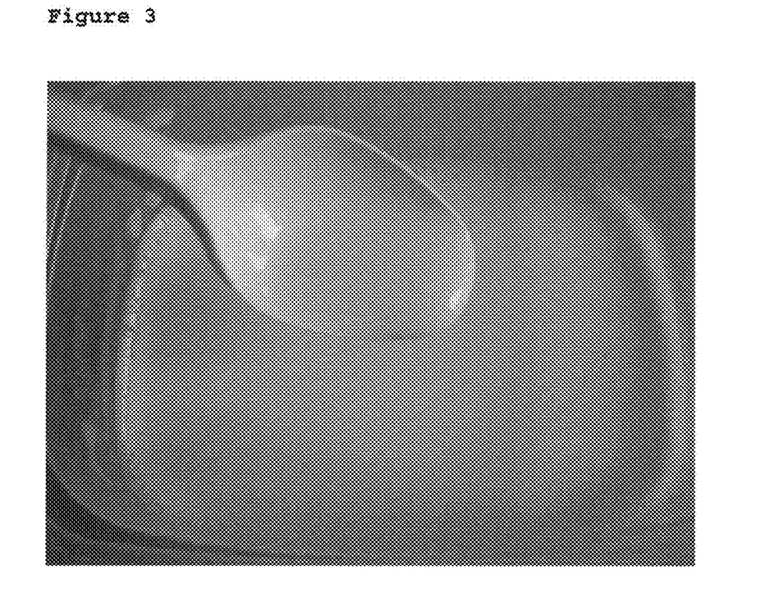
FIG. 3: Photograph of a natural yogurt drink.
Figure 4:
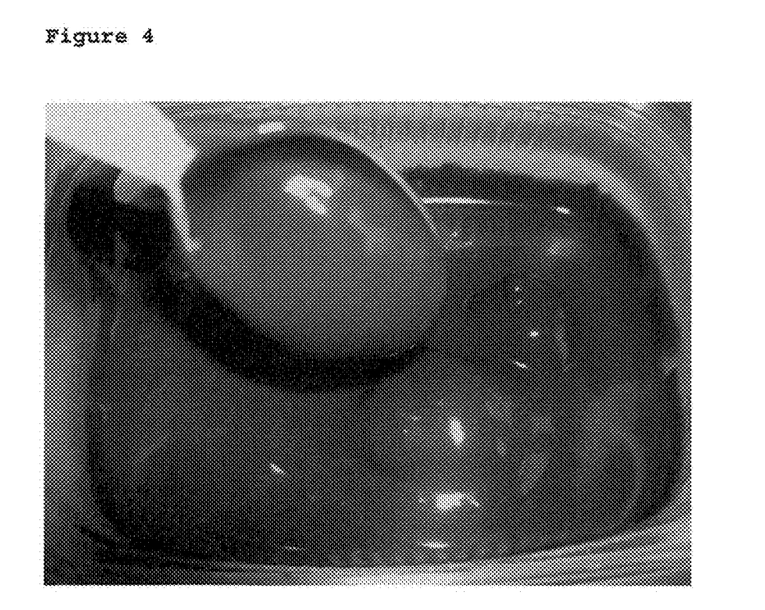
FIG. 4: Photograph of a natural yogurt drink comprising 9 mass % ground cocoa shells.

The yogurt was found to have a good chocolate flavour and a cereal aftertaste. The sourness of the yogurt was reduced relative to the yogurt base. Furthermore, the viscosity of the yogurt was increased by the addition of cocoa shells so that the yogurt had a smooth texture and was readily spoonable. This is illustrated by comparing FIG. 3 (100% yogurt) with FIG. 4 (91% yogurt, 9% cocoa shells).

TABLE 1

Summary of the Reference Example, Examples and Comparative Examples

| Example | Ingredients | Results | Stevens value at 10° C. (g) | |
|---|---|---|---|---|
| | | | (1) | (2) |
| Reference Example | 75.35% cream cheese dessert (incl. 12% sugar) 18% milk chocolate (Milka ™) 3% sucrose 3% standard alkalized Kraft Foods cocoa powder 0.65% flavourings | 50% replacement of cocoa powder with cocoa shells provided the same quality of appearance, texture, taste and stability. | N/A | N/A |
| Example 1 | 75.35% cream cheese dessert (incl. 12% sugar) 18% milk chocolate (Milka ™) 3% sucrose 1.5% standard non-alkalized Kraft Foods cocoa powder 1.5% ground cocoa shells 0.65% flavourings | | N/A | N/A |
| Example 2 | 52% cream cheese 23% cream 17.5% sucrose 6% ground cocoa shells 1.5% flavourings | The cocoa shell-containing spread produced no bitter or sour notes (cf. cocoa powder-containing spread), and had a significantly higher viscosity and a higher fibre content than the cocoa powder-containing spread. | 60 | 87 |
| Comparative Example 1 | 52% cream cheese 23% cream 17.5% sucrose 6% standard non-alkalized Kraft Foods cocoa powder 1.5% flavourings | | 26 | 41.9 |

TABLE 1-continued

Summary of the Reference Example, Examples and Comparative Examples

| Example | Ingredients | Results | Stevens value at 10° C. (g) (1) | (2) |
|---|---|---|---|---|
| Example 3 | 52% cream cheese<br>20% cream<br>14.5% sucrose<br>12% ground cocoa shells<br>1.5% flavourings | The cocoa shell-containing spread produced no bitter or sour notes (cf. cocoa powder-containing spread), and had a higher fibre and a lower fat content than the cocoa powder-containing spread. | 203 | 200 |
| Comparative Example 2 | 52% cream cheese<br>20% cream<br>14.5% sucrose<br>12% standard non-alkalized Kraft Foods cocoa powder<br>1.5% flavourings | | 195 | 198 |
| Example 4 | 50.7% cream cheese<br>17.9% cream<br>15.3% sucrose<br>3.5% butter<br>12.6% ground cocoa shells<br>No chocolate flavourings | The whipped food (16% overrun) was freeze-thaw stable and had a good chocolate taste in the absence of chocolate flavourings. | N/A | |
| Example 5 | 91% natural yogurt drink (1% fat)<br>9% ground cocoa shells | The yogurt had a good chocolate flavour and an increased viscosity. | N/A | |

(1) After storing at 4° C. for 44 days.
(2) After freezing at −18° C. for 26 days and thawing at 10° C. for two days.

The invention claimed is:

1. A smooth and creamy acidified dairy food composition comprising:
   a smooth and creamy acidified dairy food; whole ground cocoa shells, and not more than 3 mass % cocoa powder;
   the whole ground cocoa shells including both fiber and fat from the cocoa shells, having a total fat content of about 6 to about 8 mass %, and a $D_{90}$ particle size of less than 25 μm;
   wherein the smooth and creamy acidified dairy food is selected from the group consisting of cheese, sour cream, buttermilk, kefir and fromage frais;
   wherein the smooth and creamy acidified dairy food composition is free of added hydrocolloids;
   wherein the whole ground cocoa shells provide stability to the smooth and creamy acidified dairy food composition without inclusion of the added hydrocolloids; and
   wherein the smooth and creamy acidified dairy food composition having the whole ground cocoa shells exhibits reduced sour notes as compared to an otherwise identical smooth and creamy acidified dairy food composition at the same pH but without the whole ground cocoa shells.

2. An acidified dairy food composition according to claim 1, wherein the whole ground cocoa shells are contained in the food in an amount of 1-15 mass % based on the total mass of the food.

3. An acidified dairy food composition according to claim 1, wherein the food has a calorie content of 230-270 kcal per 100g.

4. An acidified dairy food composition according to claim 1, wherein the food has a fiber content of 3-9 mass % based on the total mass of the food.

5. An acidified dairy food composition according to claim 1, wherein the pH of the food is 3.5-6.0.

6. An acidified dairy food composition according to claim 1, wherein the food is spreadable.

7. An acidified dairy food composition according to claim 6, wherein the spreadable food is cream cheese.

8. An acidified dairy food composition according to claim 1, wherein the food is whipped.

9. An acidified dairy food composition according to claim 1, wherein the food is frozen.

10. A method for manufacturing an acidified dairy food composition as defined in claim 1 comprising:
    (i) blending whole ground cocoa shells with a dairy food and acidifying the dairy food, or
    (ii) blending whole ground cocoa shells with an acidified dairy food.

11. A method according to claim 10, wherein the whole ground cocoa shells are blended with a dairy food and the blended food is acidified.

* * * * *

UNITED STATES PATENT AND TRADEMARK OFFICE
CERTIFICATE OF CORRECTION

PATENT NO. : 8,865,243 B2  Page 1 of 1
APPLICATION NO. : 12/575845
DATED : October 21, 2014
INVENTOR(S) : Brandstetter et al.

It is certified that error appears in the above-identified patent and that said Letters Patent is hereby corrected as shown below:

In the Claims,

Claim 1, Column 13, Line 31, delete "food;" and insert -- food, --, therefor.

Signed and Sealed this
Twelfth Day of May, 2015

Michelle K. Lee
*Director of the United States Patent and Trademark Office*